United States Patent [19]

Komeiji et al.

[11] 4,242,888
[45] Jan. 6, 1981

[54] EXTERNAL MEMBER FOR A TRIPOD JOINT AND METHOD FOR MANUFACTURING SAME

[75] Inventors: Shigeki Komeiji; Yoshisumi Futamura; Tsugio Mizobe, all of Toyota; Morio Okayama, Togocho; Isao Iwasaki, Nagoya, all of Japan

[73] Assignee: Toyota Jidosha Kogyo Kabushiki Kaisha, Toyota, Japan

[21] Appl. No.: 912,232

[22] Filed: Jun. 2, 1978

[30] Foreign Application Priority Data

Nov. 9, 1977 [JP] Japan ................... 52-135155

[51] Int. Cl.³ .............................. F16D 3/30
[52] U.S. Cl. ........................ 64/21; 228/112
[58] Field of Search .......... 64/21; 228/173 R, 173 E, 228/112, 113, 114

[56] References Cited

U.S. PATENT DOCUMENTS

| 3,175,284 | 3/1965 | Cotovsky | 228/114 |
|---|---|---|---|
| 3,421,201 | 1/1969 | Oberle | 228/113 |
| 3,631,585 | 1/1972 | Stamm | 228/112 |
| 3,657,800 | 4/1972 | Hautala | 228/113 |
| 3,777,360 | 12/1973 | Welch | 228/112 |
| 3,965,554 | 6/1976 | Amos | 228/114 |
| 4,090,751 | 5/1978 | Krude | 64/21 |
| 4,094,376 | 6/1978 | Welschof | 64/21 |
| 4,116,020 | 9/1978 | Auctor | 64/21 |
| 4,129,345 | 12/1978 | Krude | 64/21 |

FOREIGN PATENT DOCUMENTS

| 51-4977540 | 1/1976 | Japan | 228/113 |
|---|---|---|---|
| 963681 | 7/1964 | United Kingdom | 228/113 |

Primary Examiner—Ira S. Lazarus
Attorney, Agent, or Firm—Koda and Androlia

[57] ABSTRACT

An external member for a tripod joint including a cup shaped spider holding portion for holding a spider formed with trunions and a stem portion formed with splines for power transmission coupled to the bottom of the spider holding portion and wherein the bottom of the spider holding portion is made imperforate and at least the spider holding portion or the stem holding portion is formed with an annular ridge and the spider holding portion and the stem portion are integrally friction-welded together at the annular ridge.

6 Claims, 11 Drawing Figures

EXTERNAL MEMBER FOR A TRIPOD JOINT AND METHOD FOR MANUFACTURING SAME

BACKGROUND OF THE INVENTION

1. Field of Invention

This invention relates to tripod joints and more particularly to external members for tripod joints and method for manufacturing same.

2. Prior Art

Referring to FIG. 1, shown therein is a non-extensible high joint angular tripod type tripod joint of the prior art. As shown in FIG. 1, the tripod joint includes an external member 1. The external member 1 includes a cup shaped spider holding portion 2 and a stem portion 3 integrally connected to the bottom of the spider holding portion 2. The stem portion 3 is formed with splines for transmitting power.

In the spider holding portion 2, a spider 6 is integrally formed with trunnions 5 projecting in three directions. The trunnions 5 engage with projection 7 formed on the inner surface of the spider holding portion 2 and thereby support the spider 6. The trunnions 5 are each axially slydably and rotatably coupled to roller 8. The rollers 8 roll in rolling grooves 10 of tulip shaft 9. The rollers 8 are coupled to the tulip shaft 9 such that rotating force can be transmitted even if the tulip shaft 9 and the external member 1 make an angle that is less than a predetermined value. A tripod spring 11 supports the tulip shaft 9 on the spider 6 and a poppet 12 is coupled to the end face of the spider 6 opposite to the tripod spring 11 and is urged by a compression spring 13 in a direction opposite to the tripod spring 11.

In this conventional external member 1, the spider holding portion 2 and the stem portion 3 are arc welded together to form the external member 1. In the case of arc welding, as shown in FIG. 2 for example, a flange 3A of the stem portion 3 is inserted into and welded to a large hole provided in the bottom 2B of the cup shaped spider holding portion 2.

However, in the case of arc welding, there have been such disadvantages that weld beads B, weld spatters and other deposits result on the inside of the spider holding portion 2 and their removal thereof is troublesome. Also, a large variation in bead shape results and the quality of the product is not uniform. Therefore welded external members 1 must be inspected periodically by cutting the product into sections and frequently it is not always possible to set the tripod spring 11 stably on the weld beads B having a large variation in shape when the tulip shaft 9 is assembled.

In an attempt to overcome these disadvantages, another form of external member 1 as shown in FIG. 3 has been developed.

In FIG. 3, the flange 3A formed on a stem portion 3 is friction welded to the end face of a cylindrical member 2A thereby forming the bottom of an external member 1. In the case of friction welding described above, as indicated by the reference 14 in the drawing, internal weld flash is formed inside of the external member 1. The weld flash 14 is firmly secured to the cylindrical member 2A and the flange 3A. Moreover, there are many small pieces of burrs 14A and 14B which are caught at the tips of the flash or small pieces of burrs 14C caught in the center dent of the flash formed on two sides of the flange 3A and the cylindrical member 2A in such a manner that the small caught pieces of burrs may easily fall off.

Since the amount of welding is usually set at a small value in order to prevent heat distortion and changes in the structure caused by heat treatment due to friction welding, the internal weld flash 14 radiates heat easily through heat conduction and upon completion of the welding undergoes a sharp decrease in temperature and hardens very fast. It is therefore extremely difficult to machine these hardened weld flash 14 and considerable labor and a very high cost is required to anneal them by an electric arc or flame from the inside. Even after the machining, the inside of the spider holding portion 2 must be cleansed. The cleansing treatment, including dehydrating and drying of the holding portion 2, is considerably troublesome and expensive.

Since it is so difficult to machine only the small pieces of burrs with a turning lathe or the like leaving the hardened internal weld flash 14 intact, other methods such as wire brushing, shot blasting, high speed water streams or the like have been utilized to remove the small pieces of burrs and by such methods it is almost impossible to completely remove the small pieces of burrs on the internal weld flash in a short period of time. Accordingly, such universal joints have heretofore been used as finished products that have small pieces of burrs remaining thereon which have not come off even after the removal work and include small pieces of broken wire brush or crushed small pieces of shock balls, etc. which result from the attempted removal process. These small pieces of material have created a disadvantage in that these small pieces frequently break off and cruch into between the rollers and roll grooves of the tulip shaft and cause problems.

Heretofore, there has neither been manufactured an external member, wherein a stem portion of a non-extensible tripod joint for a large angle is frictionally welded to a cup-shaped member, nor found a literature known in the art. Because the cup-shaped member in the tripod joint is made of a very thin sheet material as compared with that of the Birfield, joint such a method has been proved unsuccessful that which is inferred from the frictional welding technique of the Birfield joint having a cup-shaped member of large thickness. More, specifically there have been problems that, in general, in the case of a cup-shaped member made of a thin sheet of material, control of the conditions for frictional welding becomes difficult due to the high pressure gas confined in a space formed by the stem and the cup-shaped member, and further, a deformation is caused at the bottom of the cup-shaped member, which is bulged inwardly to the interior of the cup.

SUMMARY OF THE INVENTION

Accordingly, it is the general object of the present invention to provide an external member for a tripod joint wherein no weld flash is created on the inside surface of the cup shaped spider holding portion.

It is another object of the present invention to provide an external member for a tripod joint wherein the tripod spring is stably maintained when the tulip shaft is assembled.

It is a further object of the present invention to provide an external member for a tripod joint which does not require particular dehydrating and drying after cleansing the inner surface of the spider holding portion.

It is still a further object of the present invention to provide an external member for tripod joint wherein the power required for friction welding is decreased and the quantity of heat generated is decreased.

It is yet another object of the present invention to provide a method for making an external member for a tripod joint.

In keeping with the principles of the present invention, the objects are accomplished by a unique external member for a tripod joint including a cup shaped spider holding portion for holding a spider formed with trunnions and a stem portion formed with splines for power transmission coupled to the bottom of the spider holding portion and wherein the bottom of the spider holding portion is made imperforate, at least the spider holding portion or the stem portion is formed with an annular ridge and the spider holding portion and the stem portion are integrally friction-welded together at the annular ridge.

BRIEF DESCRIPTION OF THE DRAWINGS

The above mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
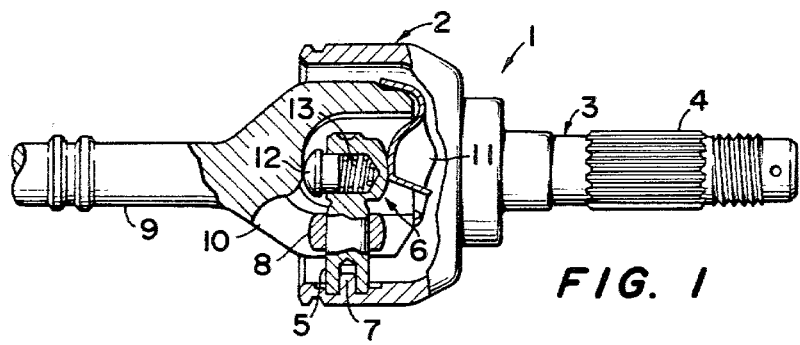
FIG. 1 is a partially broken away front view showing an external member in an assembled state with a tulip shaft.
Figure 2:
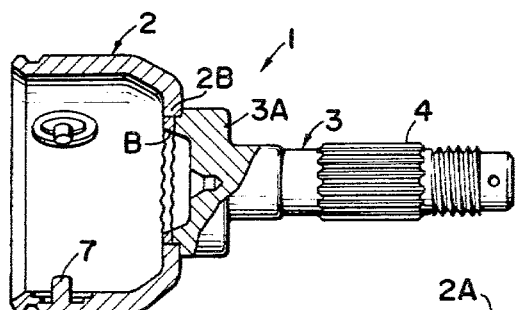
FIG. 2 is a partially broken away front view illustrating an external member of the prior art which is arc welded.
Figure 3:
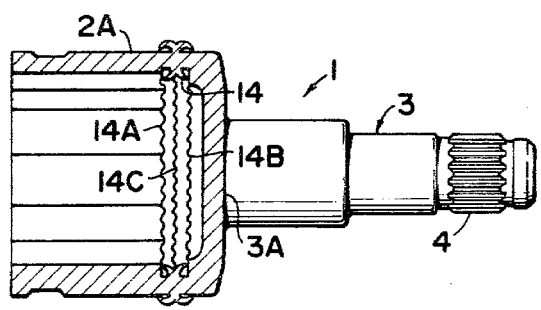
FIG. 3 is a partially broken away front view illustrating an external member of the prior art produced by friction welding.
Figure 4:
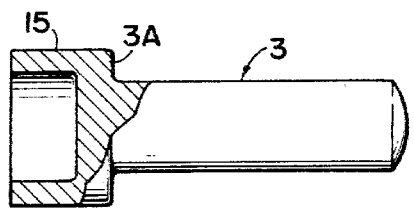
FIG. 4 is a partially broken away front view illustrating a stem portion before welding for an external member in accordance with the teachings of the present invention.
Figure 5:
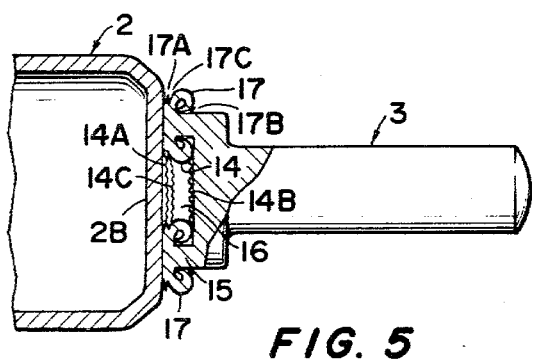
FIG. 5 is a partially broken away front view illustrating an external member after welding the stem portion of FIG. 4.
Figure 6:
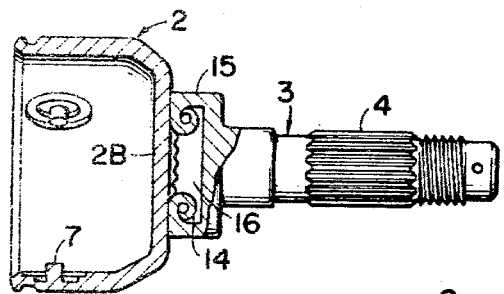
FIG. 6 is a partially broken away front view illustrating the embodiment of FIG. 5 before assembly with the spider.

Referring more particularly to the figures, shown in FIGS. 4 through 6 is one embodiment of an external member 1 in accordance with the teachings of the present invention. In the figures, an axial annular ridge 15 is projectingly formed on the end face of the welding side of the flange 3A of the stem portion 3. The bottom 2B of the spider holding portion 2 is made imperforate. As shown in FIG. 5, the annular ridge 15 of the stem portion 3 is friction welded to the bottom 2B of the spider holding portion 2.

As a result of the friction welding, internal weld flash 14 is produced in the sealed space 16 created by the angular ridge 15, the bottom 2B and the flange 3A. An external weld flash 17 is also created as a result of the friction welding.

Since the internal weld flash 14 is contained in the sealed space 16, there is no need to machine such internal weld flash 14 and internal small pieces of burrs 14A, 14B and 14C. Therefore, only the external weld flash 17 and the external small pieces of burrs 17A, 17B and 17C need be machined off. In this case, although the external weld flash 17 is usually hardened, it is easy to machine them away since the flash 17 may be easily annealed by an electric arc or flame from the outside. After the machining of the external weld flash 17, a completed and finished external member 1 is created as shown in FIG. 6.

In the above described embodiment the annular ridge 15 is formed on the flange 3A of the stem portion 3. However, the angular ridge 15 may be formed in any manner which creates the sealed space 16 enclosing therein the internal weld flash 14. Consequently, the annular ridge or ridges can be formed on the bottom 2B of the spider holding portion 2 or both on the bottom 2B and on the flange 3A.

Figure 7:
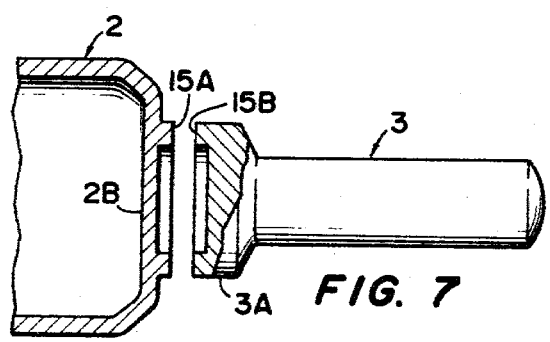
FIG. 7 is a partially broken away front view illustrating a second embodiment of the present invention immediately before welding.

In FIG. 7 is shown the annular ridges formed both on the bottom 2B of the spider holding portion 2 and on the flange 3A of the stem portion 3. In this embodiment, the heights of the annular ridge 15 is equal to the sum of the heights of the annular ridge 15A and that of the annular ridge 15B. Therefore, the heights of the annular ridges 15A and 15B can be made smaller as compared to the embodiment of FIGS. 4 through 6. Since the spider holding portion 2 is usually formed by pressing it from plate material, the annular ridge 15A can be simply formed at a low cost. The annular ridge 15B can be simply formed on the flange 3A of the stem portion 3 by forging.

Figure 8:
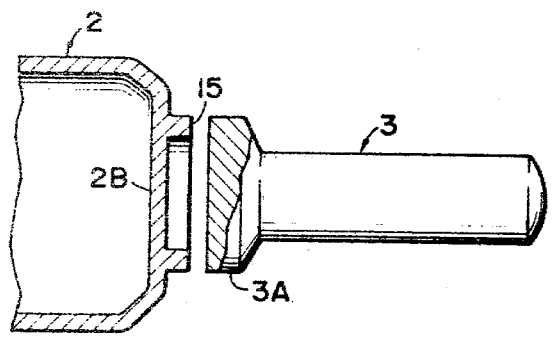
FIGS. 8 and 9 are sectional views illustrating examples of spider holding portion in accordance with the teachings of the present invention.
Figure 9:
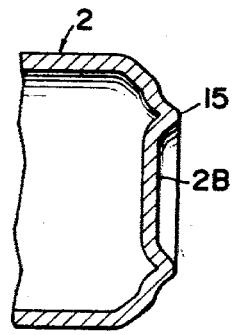

Additionally, the annular ridge 15 may be formed only on the bottom 2B of the spider holding portion 2 as shown in FIG. 8. In this case, cutting work or special pressing work is required to make the annular ridge 15 on the spider holding portion 2. Furthermore, in the case where the annular ridge 15 is formed on the bottom 2B of the spider holding portion 2, the annular ridge 15 may be projectingly formed by pressing method as shown in FIG. 9.

Figure 10:
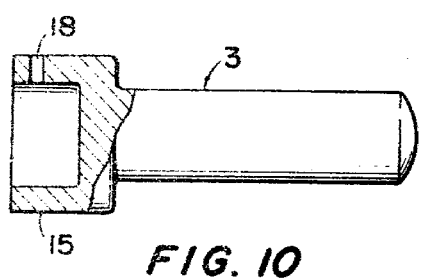
FIG. 10 is a partially broken away front view illustrating another example of a stem portion in accordance with the teachings of the present invention.

Since the annular ridge 15 or the annular ridges 15A and 15B form a sealed space 16 enclosing the internal weld flash 14, it is conceivable that the great quantity of heat generated by friction welding will cause the air enclosed in the sealed space 16 to expand and have an adverse affect upon the welding. (However, it has been found experimentally that there is little of such adverse affects). To avoid the possibility of such an adverse effect rendered by the air enclosed in the sealed space 16, it is sufficient to form a communicating port 18 communicating with the sealed space 16 in the annular ridge 15 as shown in FIG. 10. To prevent moisture and foreign material from passing through the port 18 and collecting inside the sealed space 16 and having some disadvantageous effects upon the external member 1, port 18 should be closed. To provide a simple and inexpensive means of closing the port 18, it would be desirable if the port 18 were closed by the deformation of the annular ring 15 during the friction welding operation.

To achieve this end, the port 18 is formed at a position adjacent to the connecting end face of the annular ring 18 at a point near enough to the connecting face that during friction welding the port 18 is closed by the deformation of the annular ridge 15.

Figure 11:
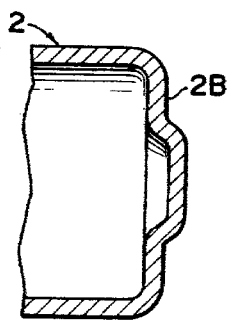
FIG. 11 is a sectional view illustrating a further example of a spider holding portion in accordance with the teachings of the present invention.

Additionally, in the embodiments described above, due to the presence of the annular ridge 15, the position where the spider 6 is installed in the spider holding portion 2 is farther from the stem portion 3 and the longitudinal dimension of the external member 1 is generally increased. The increased longitudinal dimension is lessened by outwardly projecting the central portion of the bottom 2B of the spider holding portion 2 in a stepped shape as shown in FIG. 11.

It should be apparent that since during the manufacturing of an external member by friction welding there are cases where one or both of the spider holding portion 2 and the stem portion 3 are in a state of roughly processed material, half finished product or finished product, the present invention could be applied at any point of the assembly.

From the above description it should be apparent that there are several advantages for the present invention over the prior art. Such advantages include:

1. The machining of internal weld flash and internal small pieces of burrs is not required;
2. Production costs can be reduced;
3. The internal shape of the spider holding portion can be arranged so as to stably maintain the tripod spring when the tulip shaft is assembled;
4. The power required for friction welding is decreased;
5. The quantity of heat generated by the friction welding is reduced; and
6. The amount of deformation of the shape of the spider holding portion is minimized.

In addition to the above stated advantages, additional advantages as a result of the port 18 are as follows:

1. When the stem and the cup-shaped member made of a thin sheet material are frictionally welded together the bottom of the cup-shaped member is deformed and bulged inwardly to the interior of the cup-shaped member due to the high pressure gas confined in a space formed by the stem and the cup-shaped member. If the cup is outwardly projected, the deformation value will be fully absorbed and no disadvantage is present because the bottom of the cup-shaped member is outwardly bulged in a stepped manner, anticipating the deformation value in advance.
2. The high pressure gas confined in a space formed by the stem and the cup-shaped member made of a thin sheet material can be exhausted to the outside through a port for deaeration. Furthermore, the port for deaeration is deformed and blocked upon completion of the frictional welding whereby water and foreign materials are preventing from intruding, and rusting and noise is also prevented.

It should be apparent to one skilled in the art that the above described embodiment is merely illustrative of but few of the many possible specific embodiments which represent the applications of the principles of the present invention. Numerous and varied other arrangements can be readily devised by those skilled in the art without departing from the spirit and scope of the invention.

We claim:

1. An external member for a tripod joint comprising:
   a cup shaped spider holding portion having an imperforate bottom; and
   a stem portion having an annular ridge formed on one end, said annular ridge being friction welded to said bottom of said cup shaped spider holding portion.

2. An external member for a tripod joint comprising:
   a cup-shaped spider holding portion having an imperforate bottom, a central portion of the bottom of the spider holding portion being outwardly projected in a steped shape; and
   a stem portion having an annular ridge formed on one end, said annular ridge being friction welded to said bottom of said cup-shaped spider holding portion.

3. An external member for a tripod joint comprising:
   a cup shaped spider holding portion having an imperforate bottom, said holding portion further having an annular ridge formed on said imperforate bottom; and
   a stem portion friction welded to said annular ridge.

4. An external member for a tripod joint comprising:
   a cup shaped spider holding portion having an imperforate bottom, and holding portion further having an annular ridge formed on said imperforate bottom; and
   a stem portion having an annular ridge formed on one end, said annular ridge of said stem portion being friction welded to said annular ridge on said bottom of said holding portion.

5. An external member for a tripod joint according to claim 2, further comprising a port for deaeration provided in said annular ridge at a position so close to said frictional weld that the port is substantially blocked due to heat deformation during frictional welding upon completion of the welding is frictionally welded to said spider holder formed into a cup-shape from a thin sheet.

6. An external member according to claim 3 or 4 wherein said holding portion is formed from plate material and said annular ridge is formed by pressing.

* * * * *